P. KARAMEES.
AUTOMATIC CUT-OFF VALVE.
APPLICATION FILED MAY 8, 1912.

1,042,557.

Patented Oct. 29, 1912.
2 SHEETS—SHEET 1.

Witnesses

Inventor
P. Karamees,
By Thomas Chandler
Attorneys

P. KARAMEES.
AUTOMATIC CUT-OFF VALVE.
APPLICATION FILED MAY 8, 1912.
1,042,557.
Patented Oct. 29, 1912.
2 SHEETS—SHEET 2.
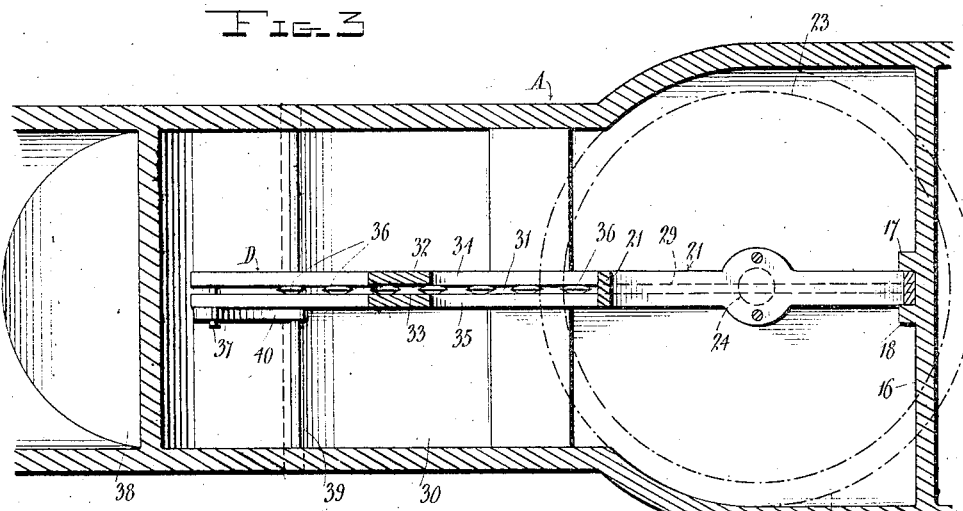
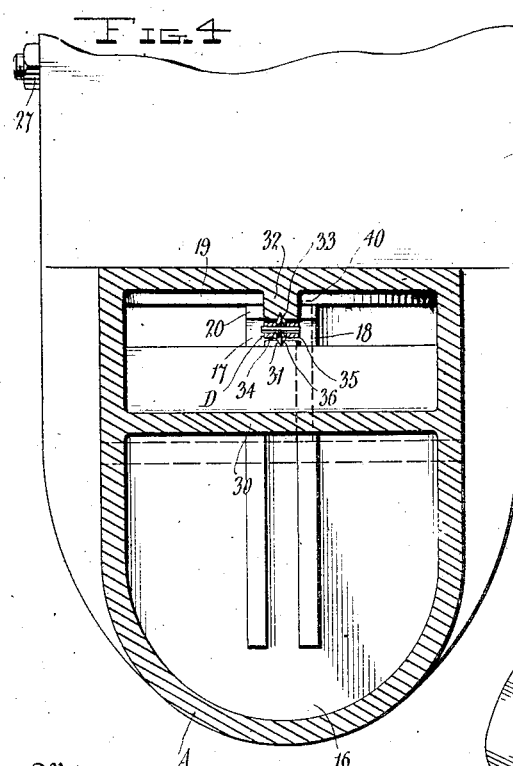
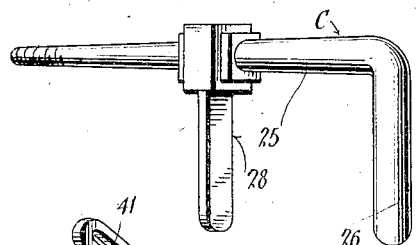
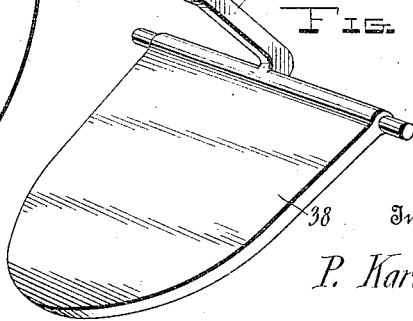
Witnesses
Inventor
P. Karamees
By Chandler & Chandler
Attorneys

UNITED STATES PATENT OFFICE.

PETER KARAMEES, OF DOUGLAS, ARIZONA.

AUTOMATIC CUT-OFF VALVE.

1,042,557. Specification of Letters Patent. Patented Oct. 29, 1912.

Application filed May 8, 1912. Serial No. 695,933.

*To all whom it may concern:*

Be it known that I, PETER KARAMEES, a citizen of the United States, residing at Douglas, in the county of Cochise, State of Arizona, have invented certain new and useful Improvements in Automatic Cut-Off Valves; and I do hereby declare the following to be a full, clear, and exact description of the invention, such as will enable others skilled in the art to which it appertains to make and use the same.

This invention relates to automatic cut off valves which will prevent the flow or passage of a liquid or vapor when the supply is cut off from its source or the pressure reduced below a predetermined amount.

The object of the invention resides in the provision of a valve of this character which includes an improved construction for permitting the passage of liquid or vapor therethrough at and above a certain predetermined pressure and automatically preventing the passage or flow when the supply is cut off, exhausted, or reduced a predetermined amount.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views, and in which—

Figure 1:
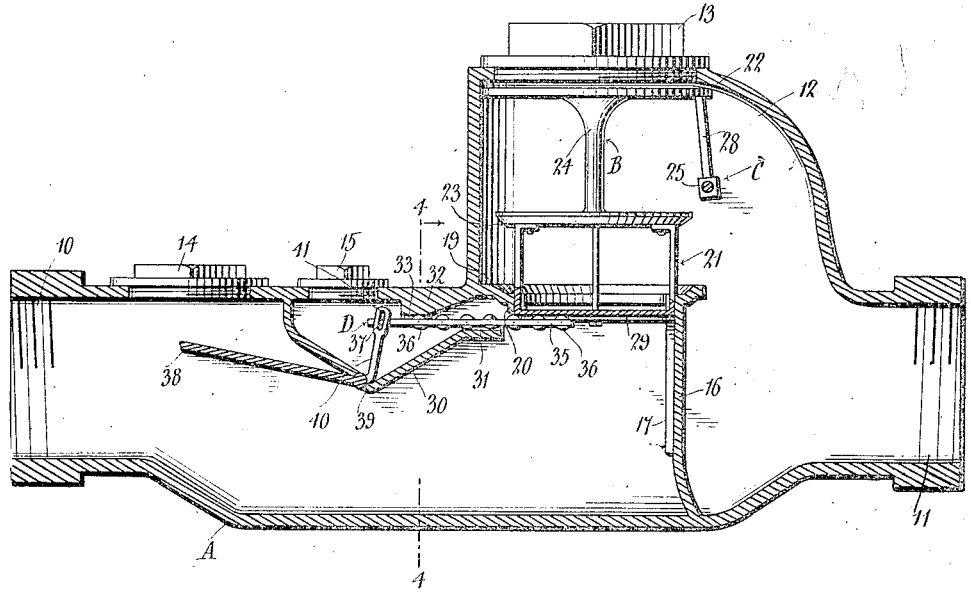
Figure 2:
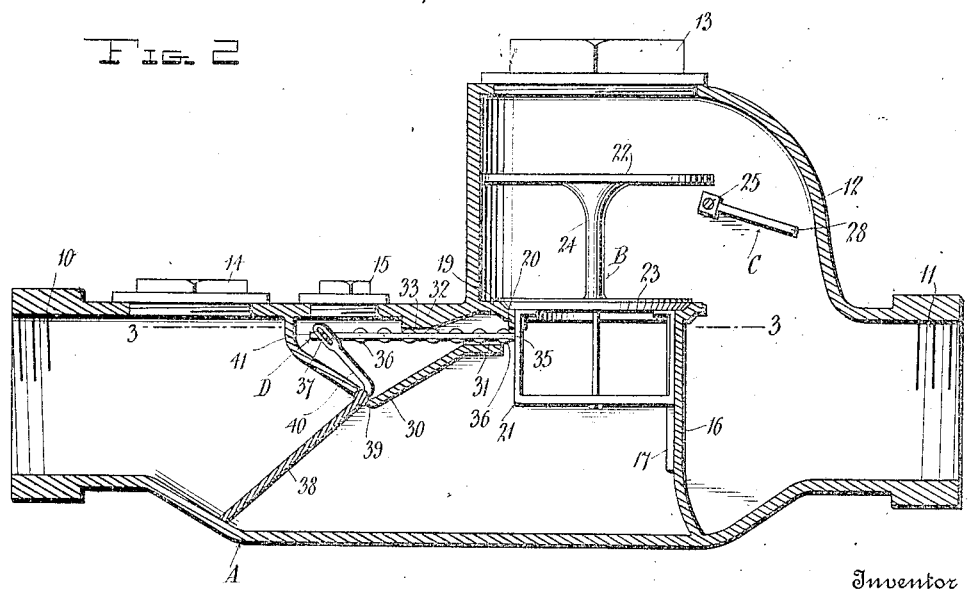

Figure 1 is a longitudinal section through a valve constructed in accordance with the invention with the parts thereof in open position, Fig. 2, a view similar to Fig. 1 with the parts of the valve in closed position, Fig. 3, a section on the line 3—3 of Fig. 2, Fig. 4, a section on the line 4—4 of Fig. 1, Fig. 5, a detail perspective view of the key utilized to manually operate the valve to open position, whereby the automatic actuation of the valve to closed position under predetermined conditions may be instituted, and Fig. 6, a detail perspective view of the pressure and gravity controlled element of the valve.

Referring to the drawings the valve is shown as comprising a casing A having interiorly threaded open ends 10 and 11 in which are adapted to be engaged suitable outlet and inlet pipes respectively. The end of the casing A adjacent the inlet opening 11 is provided with an enlarged portion 12, which enlarged portion includes in its wall a removable plug 13 whereby access to the interior of the casing may be had for assembling the parts in the interior of the casing. The smaller portion of the casing A also includes in its wall removable plugs 14 and 15 likewise adapted to afford access to the interior of the casing to facilitate assembling the interior parts of the valve.

Formed within the enlarged portion 12 of the casing between the inner end thereof and the inlet opening 11, is a vertical partition 16, the upper end of which terminates short of the top of the enlarged portion of the casing A. This partition 16 is provided on its inner side with spaced ribs 17 and 18 forming a guide groove for a purpose that will presently appear. Also formed in the casing A in the plane of the upper side of the smaller portion of said casing is a horizontal partition 19 the free end of which is extended downwardly as at 20 in parallel spaced relation to the partition 16. Slidable between the partition 16 and the downwardly extending portion 20 of the partition 19 is a U-shaped guide frame 21 one arm of which is disposed for travel between the ribs 17 and 18 whereby said frame will be properly guided in its up and down movements. Secured against the free end of the arms of the frame 21 and adapted to seat upon the partition 19 and upon the upper end of the partition 16 is a valve B. This valve is of circular formation in cross section and comprises enlarged upper and lower portions 22 and 23 respectively which are connected together by a reduced portion 24. By this construction it will be apparent that the partitions 20 and 16 constitute a seat for the valve B when said valve is disposed in a position to close the passage through the casing A. This valve B is adapted to be manually operated to open position shown in Fig. 1 by means of a key C which comprises a tapered shaft 25 journaled in the side walls of the enlarged portion 12 of the casing A and having one end thereof terminating in a laterally directed handle 26 disposed exteriorly of the casing B, while a nut 27 is threaded on the other end of the shaft 25 exteriorly of the casing A and serves to hold the shaft against disengagement from the casing. Mounted on the shaft 25 intermediate the ends thereof in a suitable manner is a laterally directed finger 28 disposed in the same plane as the handle 26 so that by observing the position of said handle the position of the finger 28 may be determined with accuracy. The finger 28 is so positioned that when the shaft 25 is rotated in one direction said finger will engage the under side of the enlarged portion 22 of the valve B and elevate said valve to open position as shown in Fig. 1. The bottom member of the frame 21 is provided with a V-shaped groove 29 extending longitudinally of the valve and for a purpose that will hereinafter appear. The casing A is further provided with a U-shaped partition 30 one end of which merges with the top wall of the smaller portion of said casing while the other end thereof is directed longitudinally of the casing in spaced relation to the top wall of the smaller portion of the casing and relatively near said top wall. This longitudinally directed end of the partition 30 is also provided with a V-shaped groove 31 on its upper side for a purpose that will hereinafter appear. The smaller portion of the casing A is provided with an interiorly disposed lug at the top thereof and adjacent its junction with the enlarged portion 12. This lug 32 is provided with a V-shaped groove 33 extending longitudinally of the casing A and parallel to the groove 31.

In order to hold the valve B in open position when the pressure of the fluid passing through the valve is above a predetermined point there is provided a movable valve support D. This support is shown as comprising a pair of parallel spaced members 34 and 35 between which are journaled a plurality of wheels 36, said wheels being guided during the movement of the support D in the grooves 29, 31 and 33. The port D adjacent the opening end of the support D adjacent the opening 10 is provided with a laterally directed pin 37 for a purpose that will presently appear. The passage through the casing A is also controlled by a gravity gate valve 38 hingedly mounted in an opening 39 in the partition 30. This valve 38 has formed integral with its hinged end an angularly disposed arm 40 directed toward the opening 10 and provided in its free end with a slot 41 in which is engaged the pin 37 of the valve support D whereby the swinging of the valve 38 will effect a reciprocation of the support D longitudinally of the casing A.

Assuming the valve B to be in closed position as shown in Fig. 2 it is only necessary in order to permit the flow of gas through the casing to elevate the valve B through the medium of the key C to the position shown in Fig. 1. The gas will then flow by the valve B and impinge against the valve 38. The pressure of the gas being sufficient will move the valve 38 from the position shown in Fig. 2 to the position shown in Fig. 1 and this movement of the valve 38 will in turn move the support D longitudinally of the casing to a position beneath the frame 21 and thus positively hold the valve B elevated independently of the key C. This key is then rotated to inactive position and the gas will continue to flow through the casing A. As soon however as the pressure of the gas falls beyond a predetermined point it will be unable to support the valve 38 in open position and said valve will then fall under the influence of gravity to the position shown in Fig. 2. This last named movement of the valve 38 will draw the support D from beneath the frame 21 when the valve B will fall to its seat and shut off the passage of gas through the casing A.

What is claimed is:

1. In an automatic fluid cut off, a casing provided with fluid inlet and outlet openings, a gravity seated valve normally closing the passage through the casing, a movable support for holding said valve in open position, a hinged valve mounted in said casing and adapted to be moved to open position by a predetermined pressure of fluid passing through the casing and to automatically move to closed position when there is a predetermined reduction of pressure in the fluid passing through the casing, and connections between said movable support and said hinged valve whereby the movement of said hinged valve to open and closed position will move said support to supporting and non-supporting position respectively with respect to said first named valve.

2. In an automatic fluid cut off, a casing provided with fluid inlet and outlet openings, a gravity seated valve normally closing the passage through the casing, a movable support for holding said valve in open position, a hinged valve mounted in said position, a hinged valve mounted in said casing and adapted to be moved to open position by a predetermined pressure of fluid passing through the casing and to automatically move to closed position when there is a predetermined reduction of pressure in the fluid passing through the casing, an arm fixed on said hinged valve and operatively engaging said movable support whereby the movement of said hinged valve to open and closed positions will move said support to supporting and non-supporting position respectively with respect to said first named valve.

In testimony whereof, I affix my signature, in presence of two witnesses.

PETER KARAMEES.

Witnesses:
 FRANK CLARK,
 C. H. SUITS.